Figure 1:
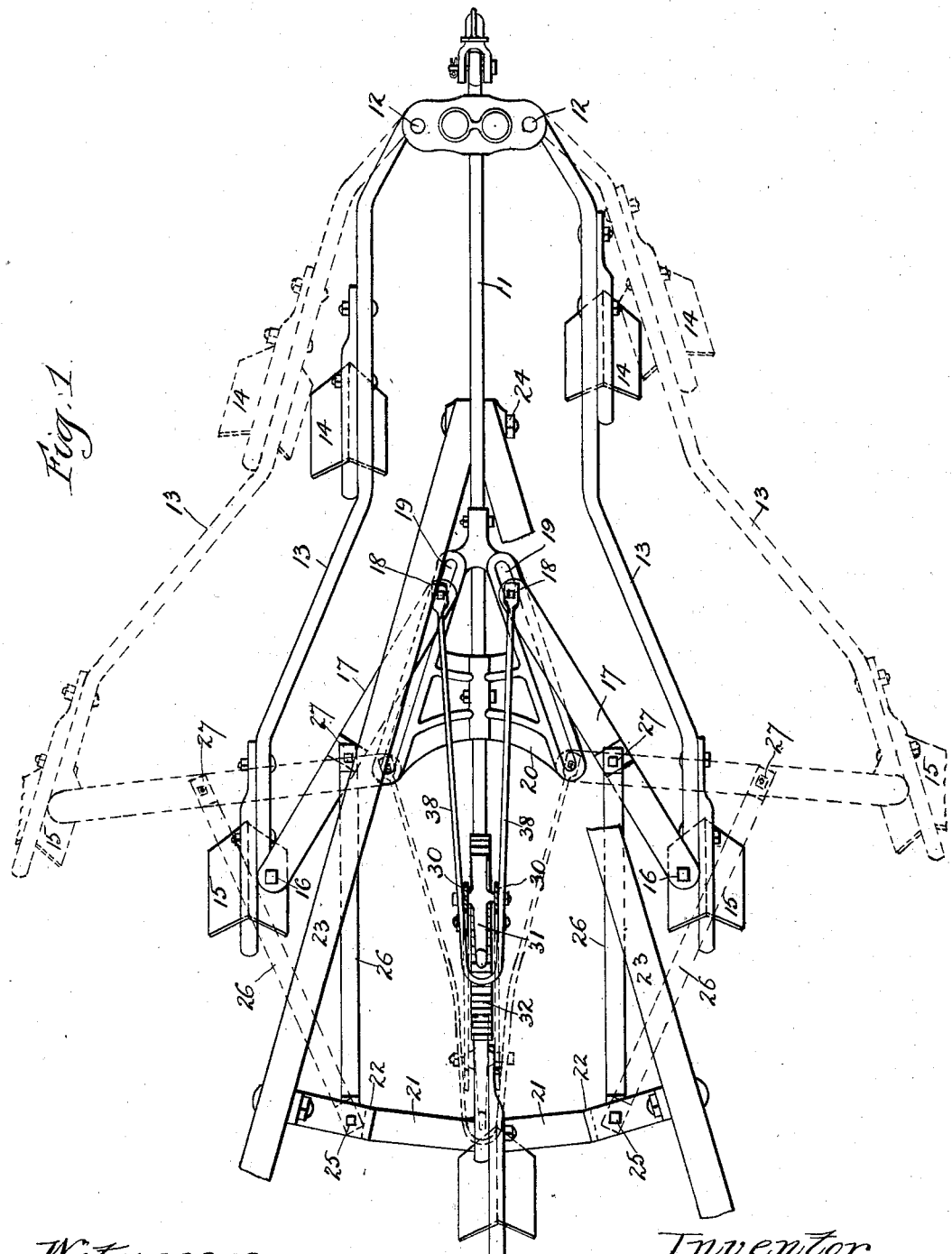

No. 610,073. Patented Aug. 30, 1898.
D. M. MOTHERWELL.
CULTIVATOR.
(Application filed Mar. 12, 1898.)
(No Model.) 2 Sheets—Sheet 1.

Witnesses.
Wm F. Hanning
R. A. White

Inventor
David M. Motherwell
by Dwight B Cheever
Att'y.

No. 610,073. Patented Aug. 30, 1898.
D. M. MOTHERWELL.
CULTIVATOR.
(Application filed Mar. 12, 1898.)
(No Model.) 2 Sheets—Sheet 2.
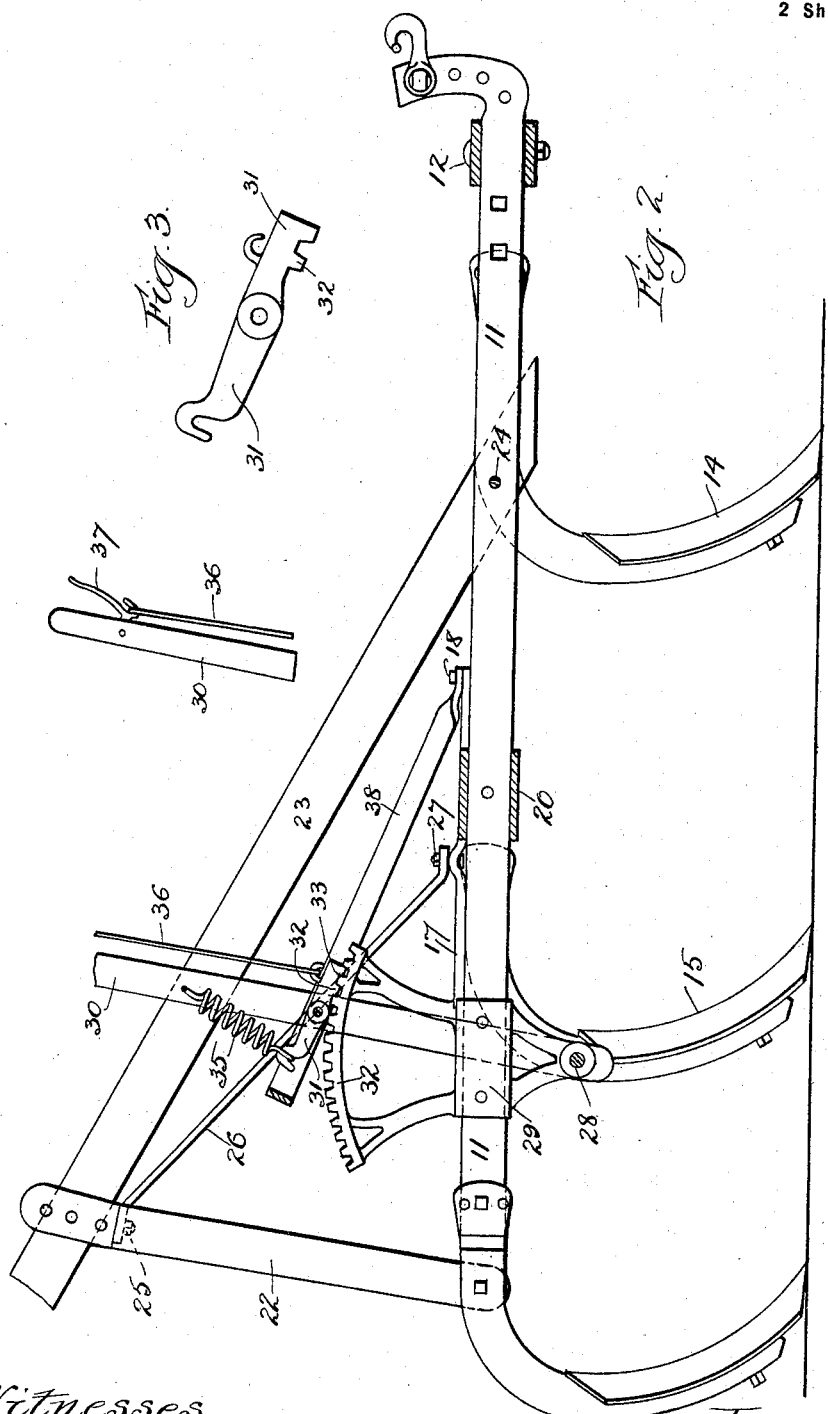
Witnesses
Inventor
David M Motherwell
By Dwight B Cheever
Atty.

UNITED STATES PATENT OFFICE.

DAVID M. MOTHERWELL, OF CHICAGO, ILLINOIS, ASSIGNOR TO THE WHITMAN & BARNES MANUFACTURING COMPANY, OF AKRON, OHIO.

CULTIVATOR.

SPECIFICATION forming part of Letters Patent No. 610,073, dated August 30, 1898.

Application filed March 12, 1898. Serial No. 673,634. (No model.)

*To all whom it may concern:*

Be it known that I, DAVID M. MOTHERWELL, a citizen of the United States, and a resident of Chicago, in the county of Cook and State of Illinois, have invented a certain new and useful Improvement in Cultivators, of which the following is a specification.

My invention relates to cultivators of the class which have adjustable spreading side frames and means to efficiently spread and hold them rigidly in position, and is an improvement upon the cultivator shown in applications heretofore filed by me and now pending before the Patent Office.

It also consists in the details of construction hereinafter described and claimed.

Figure 1 is a plan and Fig. 2 a side view of my improved cultivator. Fig. 3 is a detail view of a dog for holding the handle-bar in position.

In the drawings similar figures indicate similar parts throughout the several views.

11 is the center bar to which are hinged at 12 the side frames 13, having secured to it the working teeth 14 and 15. I find two teeth on each frame a convenient number for satisfactory work; but a different number may be used. Pivotally connected at 16 to each handle-frame is a spreading link 17, through the inner end of which passes the bolt 18. The bolt 18 also passes through and is adapted to slide in the slots 19 in the block 20, rigidly secured to the central bar 11. These links are preferably made of two bars, one above the other, with the side frame between their outer ends and the block 20 between the inner ends, with the bolt 18 passing through them and the slot, as heretofore described. If desired, the bolt may be omitted and the inner ends of the links may be provided with eyes embracing a guide or other means for establishing and maintaining the sliding connection. At the rear of the center bar and rigidly secured thereto is a framework 21, from which rise the struts 22, to which the handles 23 are bolted. The handles are also bolted to the center bar at 24. For convenience I shall refer to the frame 21, struts 22, and handles connected together as the "handle-frame." Pivotally connected to the handle-frame at 25 are the brace-rods 26, the lower ends of which are pivotally connected to the spreading links 17 at 27, the point 27 being intermediate between the ends of the spreading links 17. Pivoted at 28 to a casting 29, bolted to the central bar 11, is the lever 30, bearing the dog 31, adapted to catch in the segment 32 of casting 29 and hold the lever in any desired position. This dog has a peculiar advantage in having two teeth 33 and 34, adapted to fit in the teeth of the segment 32, thus doing away with all play and holding the lever 30 and parts attached to it rigidly in position. The dog is held in mesh with the segment by the spring 35, and is lifted out of mesh by means of the rod 36 and handle 37 under control of the operator. Pivoted to this lever 30 are the rods 38, which connect it to the bolt 18 at the inner end of the spreading links 17, so that as lever 30 is moved backward and forward the bolts are correspondingly moved in slots 19, thus moving the spreading links 17 and the side frames 13 in or out. By making the slots at a slight angle to the center bar, as shown, I am able to obtain a larger amount of spread than can be secured when the slots are parallel with the center bar, and I secure the additional spread without reducing the compactness within which the cultivator may be closed.

The heavy lines of Fig. 1 show the positions of the parts when the cultivator is closed and the dotted lines show the positions of the same parts when it is opened.

By connecting the rods 38 to bolts 18 at the inner ends of spreading links 17 I am enabled to make the slots 19 substantially straight. This has the advantage of reducing the friction and makes the spreading mechanism more easy to operate than when a curved slot is used. It also reduces the number of brace and connection rods. The use of a curved slot is fully described and claimed and in an application filed by me and now pending before the Patent Office.

The pivoted braces extending from the handle-frame to the swinging links being included in an earlier application filed by me are reserved for such application.

Having thus described my invention, what I claim as new, and desire to secure by Letters Patent, is—

1. In a cultivator, a central bar, a handle-frame extending therefrom, a pair of side frames adjustable toward and from said central bar, a pair of spreading links connected at their outer ends to said side frames, and guides for the inner end of said links making an angle with the central bar, said angular guides diverging rearwardly, in combination with braces connecting said links with stationary points.

2. In a cultivator, a central bar, a handle-frame extending therefrom, a pair of side frames adjustable toward and from said central bar, a pair of spreading links connected at their outer ends to said side frames and having their inner ends guided in substantially straight lines diverging rearwardly at an angle to the central bar, in combination with means for causing said inner ends to move in said paths and for locking them in any desired position therein.

3. In a cultivator, a central bar, a handle-frame extending therefrom, a pair of side frames adjustable toward and from said central bar, a pair of spreading links connected at their outer ends to side frames and having their inner ends guided in substantially straight lines diverging rearwardly at an angle to the central bar, in combination with means for causing said inner ends to move in said paths and for locking them in any desired position therein, and braces connecting said links with stationary points.

4. In a cultivator, in combination, a central bar, a handle-frame extending therefrom, a pair of side frames adjustable toward and from said central bar, a pair of links connected at one end with the sides frames and having their other ends guided in substantially straight lines, diverging rearwardly at an angle to the central bar, rods connecting said guided ends of said spreading links with an operating-lever and means for locking the operating-lever in desired points.

5. In a cultivator, in combination, a central bar, a side frame adjustable toward and from a central bar, a spreading link connected to said side frame and also connected to an operating-lever and substantially straight-line guides making an angle to each other and to the center bar of the cultivator and extending rearwardly thereof.

6. In a cultivator, the combination with a central bar of a block having substantially straight-line guides making an angle to each other and to the central bar and extending rearwardly thereof.

DAVID M. MOTHERWELL.

Witnesses:
  MARTIN E. NELSON,
  A. J. SMITH.